United States Patent
Jiang et al.

(10) Patent No.: US 10,587,900 B2
(45) Date of Patent: Mar. 10, 2020

(54) SYSTEMS, METHODS, AND DEVICES FOR IMAGE CODING

(71) Applicants: Futurewei Technologies, Inc., Plano, TX (US); Santa Clara University, Santa Clara, CA (US)

(72) Inventors: Minqiang Jiang, Campbell, CA (US); Jianhua Zheng, Beijing (CN); Madhusudan Kalluri, Fremont, CA (US); Nam Ling, San Jose, CA (US); Chen-Xiong Zhang, Plano, TX (US)

(73) Assignees: FUTUREWEI TECHNOLOGIES, INC., Plano, TX (US); Santa Clara University, Santa Clara, CA (US)

( * ) Notice: Subject to any disclaimer, the term of this patent is extended or adjusted under 35 U.S.C. 154(b) by 217 days.

(21) Appl. No.: 15/433,344

(22) Filed: Feb. 15, 2017

(65) Prior Publication Data

US 2017/0237991 A1    Aug. 17, 2017

Related U.S. Application Data

(60) Provisional application No. 62/295,406, filed on Feb. 15, 2016.

(51) Int. Cl.
*G06K 9/36* (2006.01)
*H04N 19/97* (2014.01)

(52) U.S. Cl.
CPC ................... *H04N 19/97* (2014.11)

(58) Field of Classification Search
CPC ........... H04N 19/97; G06T 9/00; G06T 9/001; G06T 9/002
See application file for complete search history.

(56) References Cited

U.S. PATENT DOCUMENTS

| | | | | |
|---|---|---|---|---|
| 8,620,098 B2 * | 12/2013 | Liu | ...................... | H04N 19/176 382/232 |
| 2011/0222597 A1 * | 9/2011 | Xu | ......................... | H04N 19/70 375/240.01 |
| 2015/0189283 A1 * | 7/2015 | Wang | ..................... | H04N 19/50 375/240.03 |
| 2016/0212448 A1 * | 7/2016 | Wang | ................... | H04N 19/119 |

* cited by examiner

*Primary Examiner* — Solomon G Bezuayehu
(74) *Attorney, Agent, or Firm* — Slater Matsil, LLP (57) ABSTRACT

System and method embodiments for image coding are disclosed. In an embodiment, a method in a data processing system for image encoding includes determining a sparsity constraint according to a dimension of an input image signal. The method also includes iteratively determining a plurality of approximations to the input image signal. Each iteration provides an approximation of the input image signal. Each approximation includes a set of dictionary element indices and coefficients. The dictionary is an over-complete dictionary. Iterations of the determining step are terminated when a number of iterations is equal to the sparsity constraint. The method also includes selecting one of the plurality of approximations according to a minimum rate-distortion cost. The method also includes determining an encoded image signal according to non-zero coefficients and corresponding indices for each non-zero coefficient in the selected approximation.

18 Claims, 5 Drawing Sheets

SYSTEMS, METHODS, AND DEVICES FOR IMAGE CODING

CROSS-REFERENCE TO RELATED APPLICATIONS

This application claims the benefit of U.S. Provisional Application No. 62/295,406, filed on Feb. 15, 2016, which application is hereby incorporated herein by reference.

TECHNICAL FIELD

The present invention relates generally to a system and method for image coding, and, in particular embodiments, to a system and method for image coding using Rate-Distortion (R-D) optimal Orthogonal Matching Pursuit (OMP) selection.

BACKGROUND

Transform-based coding is a technique that is widely used in image and video compression, where compression is achieved via decomposing each component block or patch over a complete dictionary known to provide compaction. Recently, there has been a growing interest in using basis selection methods for signal approximation and compression. However, signal approximation using a linear combination of basis functions from an over-complete dictionary has proven to be an NP-hard problem.

SUMMARY

In accordance with an embodiment of the present invention, a method in a data processing system for image encoding includes determining a sparsity constraint according to a dimension of an input image signal. The method also includes iteratively determining a plurality of approximations to the input image signal. Each iteration provides an approximation of the input image signal. Each approximation includes a set of dictionary element indices and coefficients. The dictionary is an over-complete dictionary. Iterations of the determining step are terminated when a number of iterations is equal to the sparsity constraint. The method also includes selecting one of the plurality of approximations according to a minimum rate-distortion cost. The method also includes determining an encoded image signal according to non-zero coefficients and corresponding indices for each non-zero coefficient in the selected approximation.

In accordance with an embodiment of the present invention, a method in a data processing system for image decoding includes obtaining a sparsity constraint for an image bitstream, the image bitstream comprising an image. The method also includes obtaining an approximation of the image, wherein the approximation comprising a set of dictionary element indices and dictionary element coefficients, the dictionary comprising an over-complete dictionary. The method also includes determining an decoded image signal according to non-zero coefficients and corresponding indices for each non-zero coefficient in the approximation according to the sparsity constraint.

In accordance with an embodiment of the present invention, an apparatus for encoding an image includes a non-transitory memory storage comprising instructions and one or more processors in communication with the memory, wherein the one or more processors execute the instructions for determining a sparsity constraint according to a dimension of an input image signal. The one or more processors also execute instructions for iteratively determining a plurality of approximations to the input image signal. Each iteration provides an approximation of the input image signal that includes a set of dictionary element indices and coefficients. The dictionary includes an over-complete dictionary. The iterations of determining the approximations are terminated when a number of iterations is equal to the sparsity constraint. The one or more processors also execute instructions for selecting one of the plurality of approximations according to a minimum rate-distortion cost. The one or more processors also execute instructions for determining an encoded image signal according to non-zero coefficients and corresponding indices for each non-zero coefficient in the selected approximation.

In accordance with an embodiment of the present invention, a non-transitory computer-readable medium storing computer instructions for encoding an image, that when executed by one or more processors, cause the one or more processors to perform the following steps is provided. The steps include determining a sparsity constraint according to a dimension of an input image signal. The steps also include iteratively determining a plurality of approximations to the input image signal. Each iteration provides an approximation of the input image signal that includes a set of dictionary element indices and coefficients. The dictionary is an over-complete dictionary. The iterations of the determining step are terminated when a number of iterations is equal to the sparsity constraint. The steps also include selecting one of the plurality of approximations according to a minimum rate-distortion cost. The steps also include determining an encoded image signal according to non-zero coefficients and corresponding indices for each non-zero coefficient in the selected approximation.

In various embodiments, the sparsity constraint is proportional to the square root of a dimension of the image. In various embodiments, the sparsity constraint is equal to twice the square root of a dimension of the image. In various embodiments, iteratively determining a plurality of approximations includes determining non-zero coefficients according to a quantization parameter. In various embodiments, iteratively determining a plurality of approximations includes determining non-zero coefficients according to a normalization of the image signal. In various embodiments, iteratively determining a plurality of approximations comprises performing an orthogonal matching pursuit (OMP) method. In various embodiments, the method, network component, or computer readable storage media further includes the step of or instructions for encoding the image signal into an image bitstream.

Various embodiments of the disclosed methods, systems, and devices provide improved performance of a network component by, inter alia, reducing the computational complexity of approximating and encoding an image signal for transmission to a user. The reduction in computation complexity results in improved speed and lower use of system resources. Various embodiments also provide other benefits as will be recognized by those of ordinary skill in the art.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

For the past few decades, complete dictionaries such as the discrete cosine transform (DCT) and discrete wavelet transform (DWT) have been the dominant transform-domain representations in practical image and video coding standards. The central idea is to transform image pixels to capture image information in a few transform coefficients. In the transform domain, the lower frequency components contain most of the image energy, while there is little information in the high-frequency components. The coefficients are quantized to form a sparse set of non-zero coefficients and compression is achieved by encoding this set. Most transforms used in image compression are complete transforms, i.e., the image is mapped to a complete set of basis functions. However, if an over-complete set of basis functions is used, an image can be more efficiently represented and image information can be captured by fewer components. The term "over-complete" means that the number of dictionary elements exceeds the signal dimension. In the early 1990s, research interests of image representation moved from a complete transform to an over-complete dictionary consisting of a group of mathematical functions called bases or elements. It has been found that finding the sparsest solution over a redundant dictionary is very difficult, i.e., NP-hard.

Orthogonal Matching Pursuit (OMP) is a greedy method used to solve this problem. The basic problem is to find a set of elements called atoms from an over-complete dictionary, whose linear combination will efficiently approximate the given signal. In an embodiment, a global target sparsity level (i.e., number of nonzero coefficients) constraint is used and the error is allowed to be distributed arbitrarily among the patches. This will result in a flexible sparse coding scheme. Also disclosed is an R-D optimization method to select the best sparse representation among iterations up to the target level. In other words, not only are approximation error or distortion considered, but bit rate associated with nonzero coefficients is also considered.

As used herein, in some embodiments, a greedy algorithm is a mathematical process that looks for simple, easy-to-implement solutions to complex, multi-step problems by deciding which next step will provide the most obvious benefit. Such algorithms are called greedy because while the optimal solution to each smaller instance will provide an immediate output, the algorithm does not consider the larger problem as a whole. In an embodiment, once a decision has been made, it is never reconsidered. In other words, a greedy algorithm is an algorithm that follows the problem solving heuristic of making the locally optimal choice at each stage with the hope of finding a global optimum.

Signal approximation using a linear combination of basis functions from an over-complete dictionary has been applied for image and video coding. Orthogonal Matching Pursuit (OMP) method is often used to select dictionary elements and their coefficients. In an embodiment, based on its iterative nature, a Rate-Distortion Optimization (RDO) method is used to select the number of nonzero coefficients according to a given sparsity constraint and a dictionary.

Disclosed herein are various systems, methods, and devices for image coding using Rate-Distortion (R-D) optimal OMP Selection. In an embodiment, an iterative OMP method terminates when the number of iterations equals a given sparsity constraint, S. In an embodiment, the typical value of S is determined as the square root of the dimension of signal y∈R$^n$ multiplied by 2. There are a total of S approximations of signal y. Each iteration provides an approximation that includes a set of dictionary element indices and coefficients $\{I^{(k)}, x^{(k)}\}$, where k=1, 2, . . . , S; $I^{(k)}$ are a set of dictionary element indices for the k$^{th}$ iteration; and $x^{(k)}$ are a set of dictionary element coefficients for the k$^{th}$ iteration. The Lagrangian multiplier used in this disclosure considers not only the quantization parameter but also the norm of signal y. In an embodiment, the best approximation is selected from among total S approximations based on the criterion of minimum R-D cost.

Disclosed herein is a Rate-Distortion Optimization (RDO) method to select the optimal number of nonzero coefficients assuming that a sparsity constraint and a dictionary are given. Rather than specifying an approximation error target such that the distortion between the original and reconstructed image is uniformly distributed among patches, embodiments of the disclosed methods select the minimal R-D solution with the given sparsity constraint. As used herein, the terms image block and image patch are used interchangeably. In an embodiment, an image patch is a group of pixels where a plurality of image patches form an image. For example, if an image contains 20×20 pixels, the image can be divided into 1000 square image patches each image patch being 2×2 pixels in size. In this example, the patch is 2 ×2 pixels in size, but in other embodiments, the patch may be larger (e.g., m×m pixels where m is an integer larger than 2) or may not be a square patch (e.g., a patch that is n×m pixels where n and m are integers and are not equal to one another).

Also disclosed is a Lagrangian multiplier adjustment method that adjusts the approximation based on quantization parameter(s) and the norm of each patch in an input image signal.

Embodiments of the disclosed systems and methods provide a mechanism to terminate an iterative approximation method to avoid using too many system resources and reduce computational complexity while still providing a good approximation of the image signal. This improves device performance for a network component transmitting an image.

1. Sparse Representation

Sparse representation is the process of modeling a signal $y \in R^n$ vector as a sparse linear combination of very few elements chosen from an over-complete dictionary $D \in R^{n \times m}$, a collection of many signal bases, where m is considerably larger than n and D is a full-rank matrix. In an embodiment, it is desirable to approximate y with the smallest number of dictionary elements. Given sparsity level s and dictionary D, sparse representation favors coefficients that minimize the reconstructed errors under the sparsity constraint, shown as $$\min_x \|y - Dx\|_2 \text{ s.t. } \|x\|_0 \leq s.$$

where $x \in R^m$ is the vector which consists of the coefficients representing the signal y, and $\|\cdot\|_2$ denotes the $l_2$ norm of a signal. To solve this NP-hard problem, OMP method is simple yet effective.

2. Orthogonal Matching Pursuit (OMP)

The method fundamentally decomposes the signal into a linear expansion of dictionary elements. To achieve this decomposition, the method aims to reduce a residual term, which is initially set to the original signal being approximated. OMP is an iterative method based on three steps: (1) projecting the residual to the selected basis, (2) greedy selection of the basis that most closely matches the residual, and (3) the update of coefficients. After some iterations the method terminates if the norm of the residual falls below a desired approximation error bound or if the number of distinct atoms in the approximation equals a desired sparsity constraints. Each iteration produces an approximation of the signal. Once the iterations terminate, a rate-distortion cost is determined for each of the plurality of approximations and the approximation with the best rate-distortion cost is selected as the approximation of the signal. The dictionary indices and coefficients corresponding to the selected approximation are used to encode the image data into a bit stream to send to a user. A more formal definition of the method is disclosed below.

In an embodiment, initially, the dictionary D is normalized, and the support sets initialized as $I^{(o)} = o$, $x^{(o)} = o$.
for k=1, 2, . . . , S do
Element selection: determine an index j* and add it to $I^{(k-1)}$.

$$r^{(k)} = y - Dx^{(k-1)} \text{(compute the residual)}$$

$$j^* = \arg \min_{j=1,\ldots,n} \|r^{(k)} - d_j x\|_2$$

(find the column that reduces residual most)

$$I^{(k)} = I^{(k-1)} \cup \{j^*\} \text{(add } j^* \text{ to } I^{(k-1)}\text{)}$$

Coefficient update: with support $I^{(k)}$, minimize the estimation residual, $$x^{(k)} = \arg \max_{x:x_j=0, j \notin I^{(k)}} \|y - Dx\|_2$$

end for

3. R-D Optimal OMP Selection

As the above OMP method indicates, the solution or approximation of y is available at iteration k, consisting of $\{I^{(k)}, x^{(k)}\}$. The signal y is approximated as:

$$y \approx Dx$$

One new index is added to the support set while all previous coefficients are re-evaluated. There are at least two ways to terminate the OMP process. A first method is to use some error target to stop the process when the norm of the residual is less than this target error $\epsilon$, which can be computed based on the desired PSNR value as the following:

$$\epsilon^2 = I_{max}^2 b / 10^{PSNR/10},$$

where b is the number of pixels in a patch, and $I_{max}$ denotes the maximum intensity value of pixels. This method may result in many atoms being used for some patches with high norm values. A second method is to end the OMP process when the number of nonzero coefficients reaches the global sparsity constraint S. At this point, there are S sets of solutions available starting with a singleton set to a set of S elements. The question is how to select the optimal solution. We denote k as the number of nonzero coefficients in the following discussion. In this disclosure, we adopt an R-D optimal method to select the optimal solution among S solutions.

The widely used method in modern image/video coding is to compute the R-D cost J of each patch:

$$J = D(k) + \lambda R(k)$$

where D(k) is the distortion measured by the sum squared error (SSE) between the original and the approximated signals, R(k) is the estimated number of bits associated with the $k^{th}$ solution, and $\lambda$ is the Lagrangian multiplier. R(k) consists of three parts, the required bits for the header, the nonzero coefficients and their indices, denoted as $R_H$, $R_C$, and $R_I$, respectively. $R_H$ tells the decoder how many dictionary elements were used for reconstruction. $R_C$ is the number of entropy coded bits for nonzero coefficients. $R_I$ is the number of bits needed to represent the indices of dictionary elements. It has been found by the inventors that the probability distribution of indices of selected elements are roughly uniform. Hence, there is no guaranteed method to find the nonzero coefficients first by using a particular scanning order.

This is different from the case of DCT, where the transform coefficients tend to be concentrated at the low frequency end. Thus, if the number of dictionary elements is m, each index is coded with $\log_2 [m]$ bits. R(k) is then simply given by:

$$R(k) = R_H + R_C + R_I.$$

Currently, a good model to estimate $\lambda$ does not exist. Computational complexity is too high if a multi-pass search is used. As adopted in the H.264 encoding software, $\lambda$ is determined by:

$$\lambda = 0.85 * 2^{(QP-12)/3.0}$$

One drawback of this formula is that it is not adaptive to the content of the patch. In an embodiment, a factor of w=norm/56.0 is used to adjust $\lambda = w * \lambda$ for 8×8 patches. The higher the norm, the increased value of $\lambda$ will prevent the consumption of too many bits for complicated patches. Once D(k), R(k), and $\lambda$ are available for all the solutions, the R-D optimal k can be determined by, $$k^* = \arg \min_{k \in \{1,2,\ldots,S\}} \{D(k) + \lambda R(k)\},$$

After the R-D optimal selection, the coefficients are quantized. Quantization may result in a reduced number of nonzero coefficients. The chosen k, coefficients and indices are then entropy coded. In total, encoding generates the optimal sparse approximation of each original patch.

In an embodiment, the dictionary, D, is trained offline by employing a K-SVD procedure using a plurality of training images, and the same dictionary is incorporated into both the encoder and the decoder. In image and video coding applications, DCT is applied to prediction residuals. Hence, training images are pre-processed to generate residual images. The pre-processing step that is applied to the training images involves the removal of their low-frequencies components. Each training image is down-scaled by a factor of 2, and this down sampled image is then scaled up back to the original size. The difference or residual image is obtained by subtracting the scaled image from the original image. The K-SVD dictionary training procedure is then applied to patches collected from these difference images. The reason for this step is to focus the training on characterizing edges and texture content within the training images. This is reasonable from a perceptual viewpoint, since people are more sensitive to the high-frequency content of the image.

In an embodiment, a typical value of the sparsity constraint level, S, is the square root of the dimension of signal y∈R$^n$ multiplied by 2. In this embodiment, the value of S is selected from 1, 2, . . . , n as necessary.

In an embodiment, the solution or approximation of y is available at iteration k, consisting of $\{I^{(k)}, x^{(k)}\}$, where k=1, 2, . . . , S. y is computed as $Dx^{(k)}$.

The typical value of distortion D(k) is the sum of squared error between signal y and its approximation $Dx^{(k)}$. Other distortion measurements can also be used such as the sum of absolute error.

In an embodiment, R(k) is the estimated number of bits associated with the $k^{th}$ solution.

In an embodiment, the Lagrangian multiplier is computed as $\lambda=0.85*2^{(qp-12)/3.0}$, which is further adjusted to be $\lambda=w*\lambda$, where w is the ratio of the norm of the signal and a predefined threshold (for example, a threshold of value 56.0 for an 8×8 patch).

In an embodiment, the R-D cost is computed as $D(k)+\lambda R(k)$ at iteration k, where k=1, 2, . . . , S.

In an embodiment, the best k is determined by $$k^* = \arg\min_{k\in\{1,2,\ldots,S\}} \{D(k) + \lambda R(k)\},$$

therefore, the approximation of y is selected to be the solution at iteration k*.

Experimental Results

Figure 1:
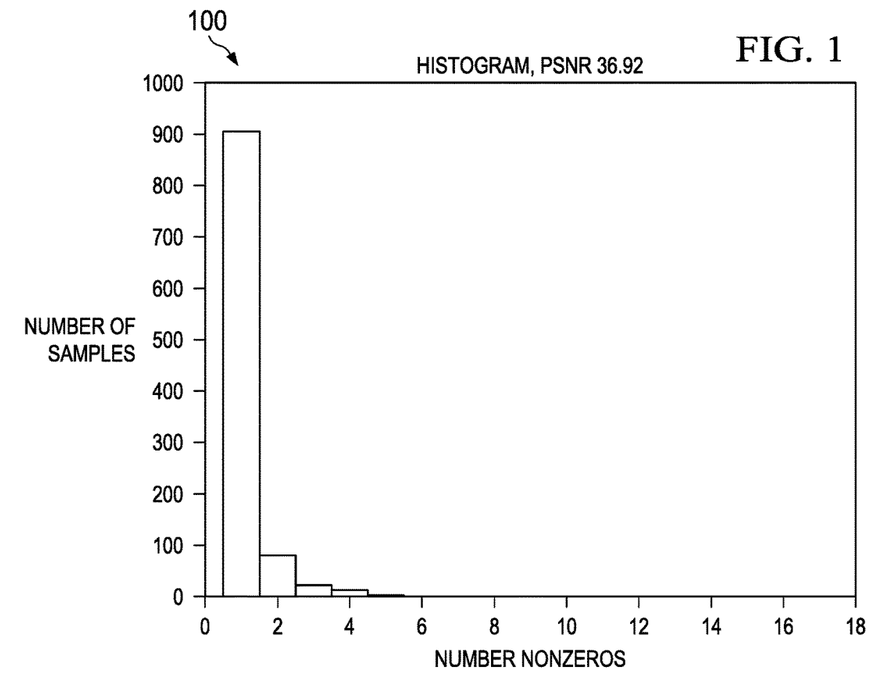
FIGS. 1 and 2 are diagrams illustrating the effectiveness of an embodiment R-D optimal OMP selection method on a test image.
Figure 2:
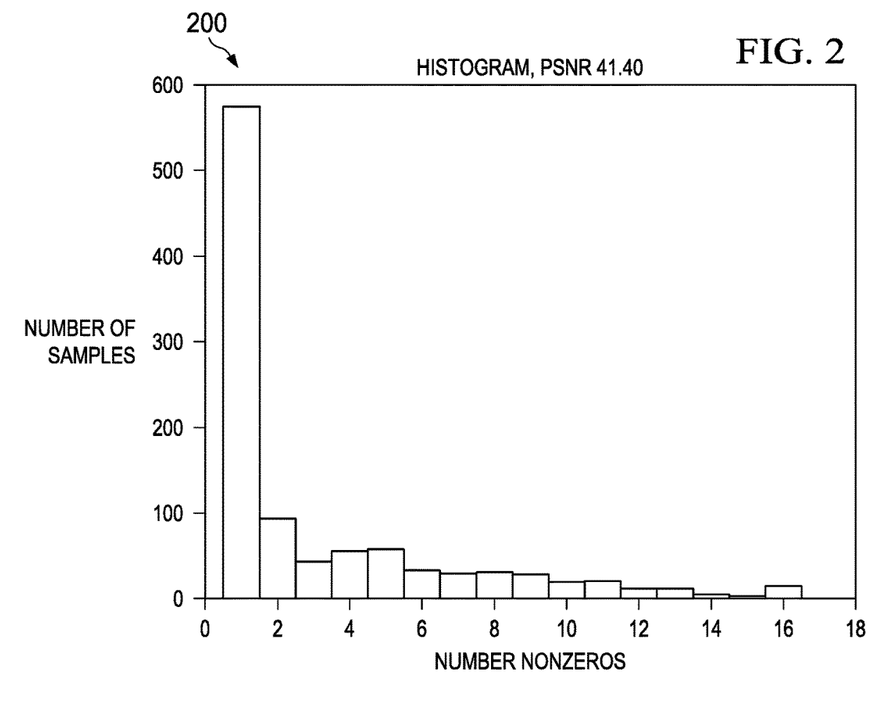

Standard images like Lena, Barbara, Pepper, etc. have been used to test the disclosed methods. These images were not used for the initial training of the dictionaries. The encoding method described above was not applied on these original images but on their residuals that were obtained by the procedure described above. In the experiments, the global sparsity constraint was set to 16 for 8×8 patches. FIG. 1 and FIG. 2 show the effectiveness of the disclosed R-D optimal OMP selection method on the Lena test image. FIG. 1 shows a histogram 100 of a number of nonzero coefficients with lower PSNR. FIG. 2 shows a histogram 200 of a number of nonzero coefficients with higher PSNR. At lower PSNRs, the number of nonzero coefficients that was selected for a majority of the patches is 1 and not more than 5 for any patch. This was in line with expectations. In the higher PSNR cases, there was a higher likelihood to have more number of nonzero coefficients selected; and a noticeable number of samples corresponding to value 16 can be observed. Selection of a sparsity value of 16 in spite of the higher bit rate for some of the patches demonstrates the importance of reducing the distortion level at the expense of a higher bit rate, in minimizing the overall cost J. In general, these patches are significant contributors to the higher PSNR.

The R-D performance of a disclosed embodiment of the OMP selection method and DCT is compared in Table. PSNRs of the methods in this disclosure can be improved up to 3.66 dB with an average improvement of 1.51 dB.

TABLE I

Comparison of bit rates and PSNR values

| Image Name | Bit rate with DCT (bpp) | PSNR with DCT (dB) | Bit rate with the proposed method (bpp) | PSNR with the proposed method (dB) | Improvement in PSNR with the proposed method over DCT (dB) |
| --- | --- | --- | --- | --- | --- |
| barbara | 0.42 | 33.98 | 0.40 | 34.96 | 0.98 |
|  | 0.65 | 35.97 | 0.74 | 37.87 | 1.90 |
|  | 1.23 | 39.67 | 1.08 | 39.72 | 0.05 |
| coastguard | 0.34 | 33.44 | 0.33 | 34.05 | 0.61 |
|  | 0.78 | 36.13 | 0.77 | 37.15 | 1.02 |
|  | 1.35 | 39.65 | 1.34 | 39.84 | 0.19 |
| comic | 0.74 | 29.88 | 0.74 | 32.12 | 2.24 |
|  | 1.59 | 33.76 | 1.60 | 36.01 | 2.25 |
|  | 2.34 | 37.36 | 2.33 | 38.30 | 0.94 |
| flowers | 0.30 | 32.80 | 0.30 | 34.84 | 2.04 |
|  | 0.59 | 34.26 | 0.62 | 37.61 | 3.35 |
|  | 1.02 | 36.25 | 1.03 | 39.91 | 3.66 |
| lena | 0.32 | 35.42 | 0.32 | 36.92 | 1.50 |
|  | 0.53 | 36.85 | 0.55 | 39.41 | 2.56 |
|  | 0.85 | 38.66 | 0.86 | 41.40 | 2.74 |
| pepper | 0.27 | 36.87 | 0.27 | 36.93 | 0.06 |
|  | 0.37 | 37.26 | 0.37 | 37.73 | 0.47 |
|  | 0.60 | 37.93 | 0.63 | 38.68 | 0.75 |
| Average | 0.79 | 35.90 | 0.79 | 37.41 | 1.51 |

Figure 3:
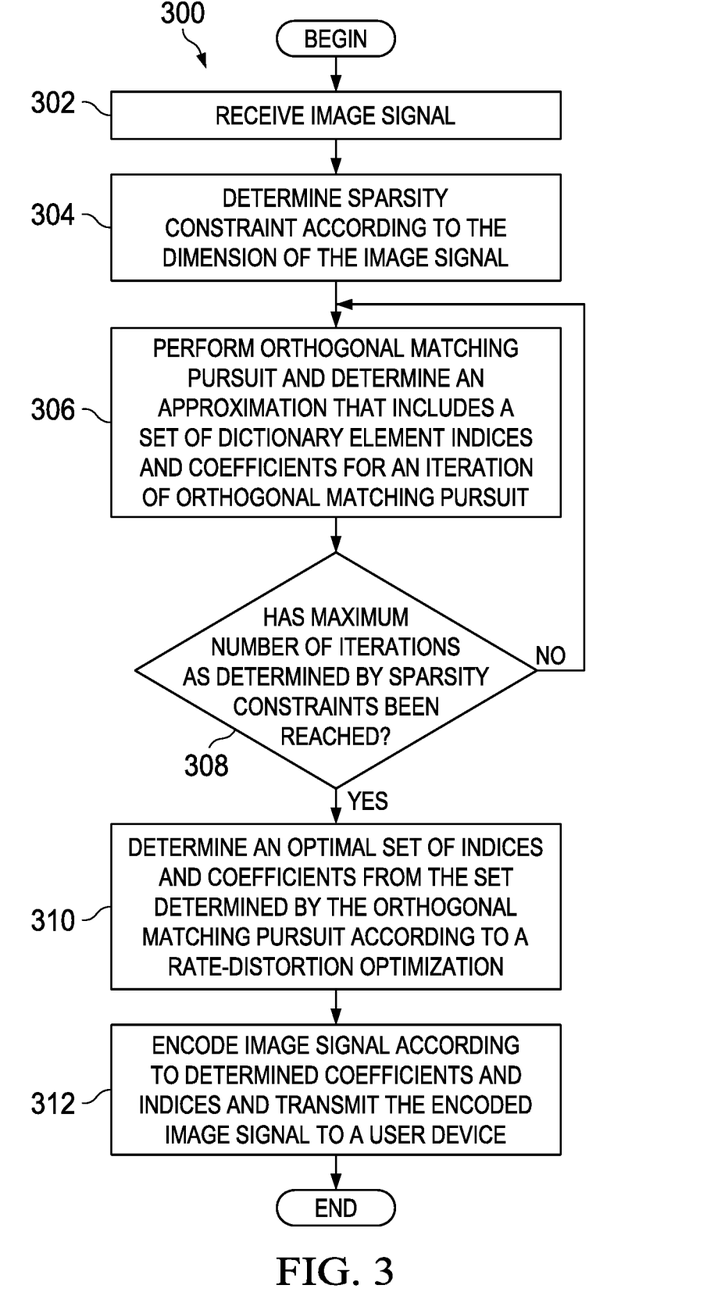
FIG. 3 is a flowchart of an embodiment of a method for image coding.

FIG. 3 is a flowchart of an embodiment of a method 300 for image encoding. The method 300 begins at block 302 where an image signal is received. At block 304, a sparsity constraint is determined according to the dimension of the image signal. In an embodiment, the sparsity constraint is proportional to the square root of the dimension size of the image signal. At block 306, OMP is performed on the image signal (or a patch of the image signal) and an approximation of the image signal is determined, the approximation includes a set of dictionary element indices and coefficients for an iteration of OMP. At block 308, the method 300 determines whether a maximum number of iterations as determined by sparsity constraints been reached. If no, then the method 300 proceeds to block 306 and OMP is performed again to determine another approximation of the signal that includes a set of dictionary element indices and coefficients for a next iteration of OMP. If, at block 308, a maximum number of iterations have been reached, then the method 300 proceeds to block 310 and one of the approximations is selected as an optimal approximation according to a rate-distortion optimization procedure and optimal set of indices and coefficients from the set determined by the OMP according to a rate-distortion optimization. At block 312, the set of dictionary indices and coefficients corresponding to the selected optimal approximation are used to encode image signal the encoded image signal is transmitted to a user device.

Figure 4:
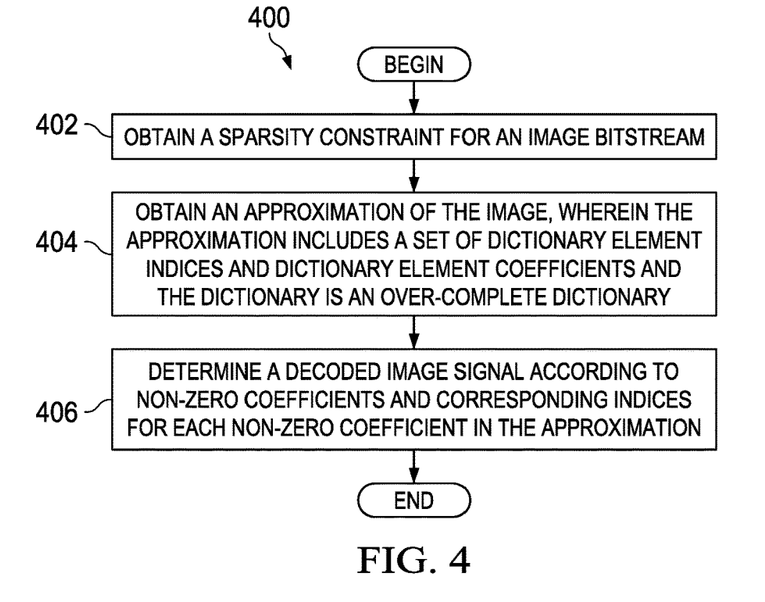
FIG. 4 is a flowchart of an embodiment of a method for decoding an encoded image.

FIG. 4 is a flowchart of an embodiment of a method 400 for decoding an encoded image. The method 400 begins at block 402 where a sparsity constraint for an image bitstream is obtained. At block 404, an approximation of the image is obtained. The approximation includes a set of dictionary element indices and dictionary element coefficients. Furthermore, the dictionary is an over-complete dictionary. At block 406, the method 400 determines a decoded image signal according to non-zero coefficients and corresponding indices for each non-zero coefficient in the approximation and according to the sparsity constraint.

Figure 5:
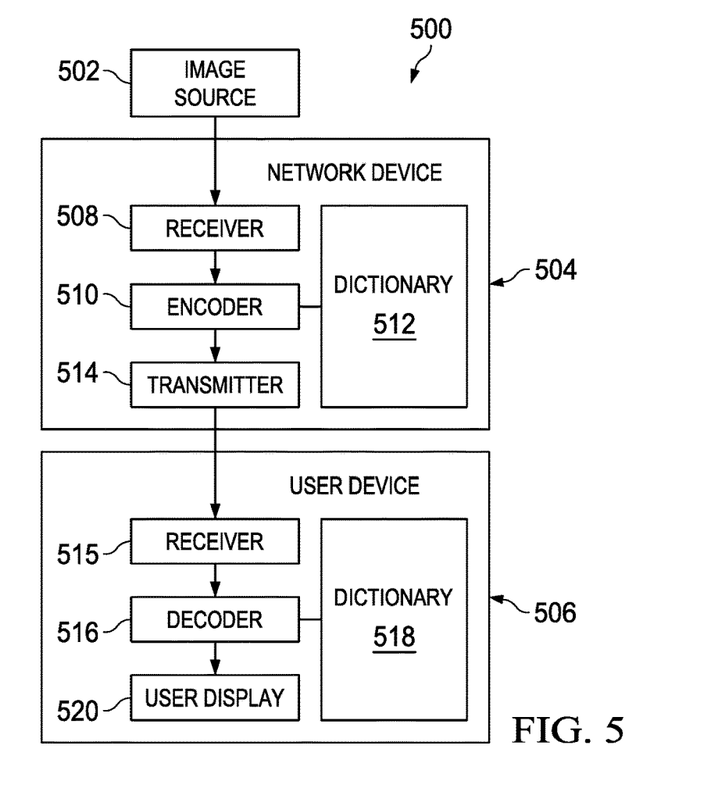
FIG. 5 is a block diagram of an embodiment system for encoding an image.

FIG. 5 is a block diagram of an embodiment system 500 for encoding an image. System 500 includes an image source 502, a network device 504, and a user device 506. The network device 504 includes a receiver 508 to receive the image from the image source 502, an encoder 510, a dictionary 512, and a transmitter 514 to transmit the encoded image signal to the user device 506. The encoder 510 encodes the image according to the methods described above. The user device 506 includes a receiver 515 to receive the encoded image, a decoder 516, a dictionary 518, and a user display 520. The decoder 516 decodes the encoded image received from the device using the dictionary 518. The dictionary 518 in the user device 506 and the dictionary 512 in the network device are populated with the same data. The decoded image signal is sent to the user display 520 to be presented to a user.

Figure 6:
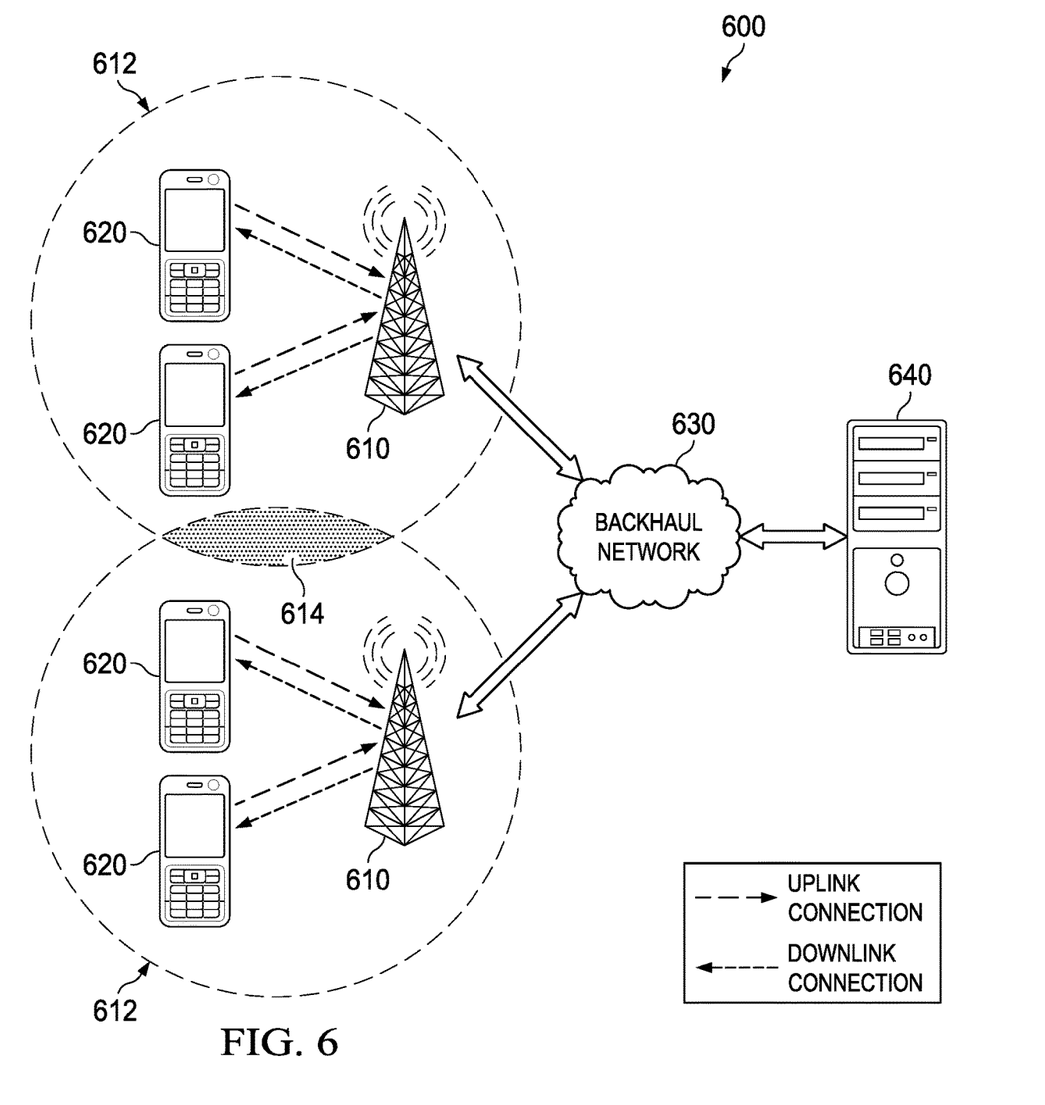
FIG. 6 illustrates a network for communicating data.

FIG. 6 illustrates a network 600 for communicating data. The network 600 comprises a plurality of access points (APs) 610 each having a coverage area 612, a plurality of user equipment (UEs) 620, a backhaul network 630, and a media server 640. As used herein, the term AP may also be referred to as a transmission point (TP), a base station (BS), or a base transceiver station (BTS), and the terms may be used interchangeably throughout this disclosure. These coverage areas represent the range of each AP 610 to adequately transmit data, and the coverage areas of adjacent APs 610 may have some overlap 614 in order to accommodate handoffs between APs 610 whenever a UE 620 exits one coverage area 612 and enters an adjacent coverage area 612. The AP 610 may comprise any component capable of providing wireless access by, inter alia, establishing uplink (dashed line) and/or downlink (dotted line) connections with the UEs 620, such as a base transceiver station (BTS), an enhanced base station (eNB), a femtocell, and other wirelessly enabled devices. The UEs 620 may comprise any component capable of establishing a wireless connection with the AP 610. For example, the UE 620 may be a smartphone, a laptop computer, a tablet computer, a wireless telephone, etc. The UEs 620 may also be referred to as wireless devices, mobile devices, or wireless mobile devices. The backhaul network 630 may be any component or collection of components that allow data to be exchanged between the AP 610 and a remote end (not shown). In some embodiments, the network 600 may comprise various other wireless devices, such as relays, femtocells, etc.

The media server 640 encodes images according to the systems and methods described herein and transmits the encoded images to one or more of the UEs 620. Although described in terms of a wireless network, the systems and methods disclosed herein may be applied to devices operating in any type of network. Also, the systems and methods may be implemented in other types of devices other than media servers. Network 600 is merely an example of a network in which the disclosed methods and systems may be implemented.

Figure 7:
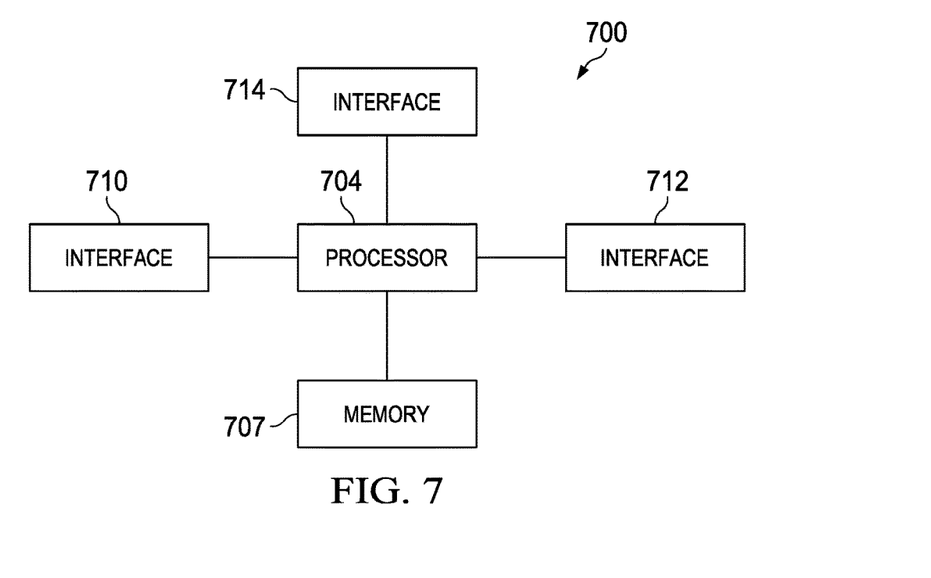
FIG. 7 illustrates a block diagram of an embodiment processing system for performing methods described herein, which may be installed in a host device.

FIG. 7 illustrates a block diagram of an embodiment processing system 700 for performing methods described herein, which may be installed in a host device. As shown, the processing system 700 includes a processor 704, a memory 706, and interfaces 710-714, which may (or may not) be arranged as shown in the figure. The processor 704 may be any component or collection of components adapted to perform computations and/or other processing related tasks, and the memory 706 may be any component or collection of components adapted to store programming and/or instructions for execution by the processor 704. In an embodiment, the memory 706 includes a non-transitory computer readable medium. The interfaces 710, 712, 714 may be any component or collection of components that allow the processing system 700 to communicate with other devices/components and/or a user. For example, one or more of the interfaces 710, 712, 714 may be adapted to communicate data, control, or management messages from the processor 704 to applications installed on the host device and/or a remote device. As another example, one or more of the interfaces 710, 712, 714 may be adapted to allow a user or user device (e.g., personal computer (PC), etc.) to interact/communicate with the processing system 700. The processing system 700 may include additional components not depicted in the figure, such as long term storage (e.g., non-volatile memory, etc.).

In some embodiments, the processing system 700 is included in a device that is accessing, or part otherwise of, a telecommunications network. In one example, the processing system 700 is in a network-side device in a wireless or wireline telecommunications network, such as a base station, a relay station, a scheduler, a controller, a gateway, a router, an applications server, or any other device in the telecommunications network. In other embodiments, the processing system 700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 710, 712, 714 connects the processing system 700 to a transceiver adapted to transmit and receive signaling over the telecommunications network.

Figure 8:
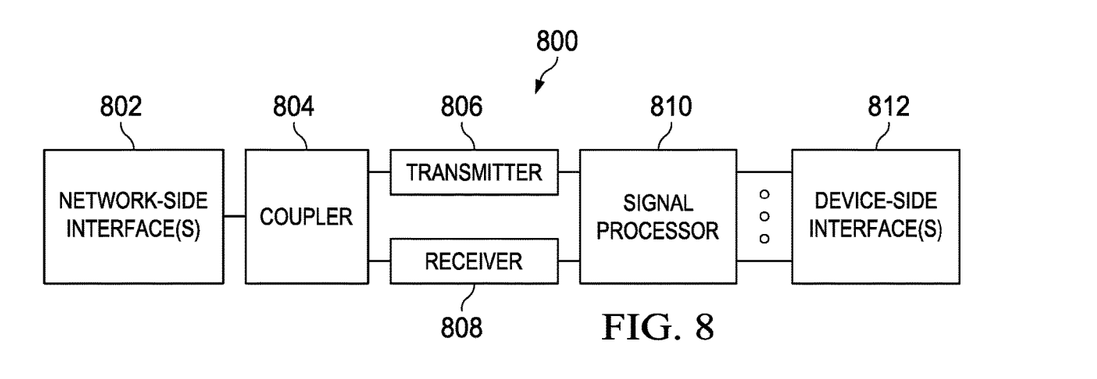
FIG. 8 illustrates a block diagram of a transceiver adapted to transmit and receive signaling over a telecommunications network.

FIG. 8 illustrates a block diagram of a transceiver 800 adapted to transmit and receive signaling over a telecommunications network. The transceiver 800 may be installed in a host device. As shown, the transceiver 800 comprises a network-side interface 802, a coupler 804, a transmitter 806, a receiver 808, a signal processor 810, and a device-side interface 812. The network-side interface 802 may include any component or collection of components adapted to transmit or receive signaling over a wireless or wireline telecommunications network. The coupler 804 may include any component or collection of components adapted to facilitate bi-directional communication over the network-side interface 802. The transmitter 806 may include any component or collection of components (e.g., up-converter, power amplifier, etc.) adapted to convert a baseband signal into a modulated carrier signal suitable for transmission over the network-side interface 802. The receiver 808 may include any component or collection of components (e.g., down-converter, low noise amplifier, etc.) adapted to convert a carrier signal received over the network-side interface 802 into a baseband signal. The signal processor 810 may include any component or collection of components adapted to convert a baseband signal into a data signal suitable for communication over the device-side interface(s) 812, or vice-versa. The device-side interface(s) 812 may include any component or collection of components adapted to communicate data-signals between the signal processor 810 and components within the host device (e.g., the processing system 700, local area network (LAN) ports, etc.).

The transceiver 800 may transmit and receive signaling over any type of communications medium. In some embodiments, the transceiver 800 transmits and receives signaling over a wireless medium. For example, the transceiver 800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 802 comprises one or more antenna/radiating elements. For example, the network-side interface 802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 800 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In accordance with an embodiment of the present invention, a method in a data processing system for image encoding includes determining a sparsity constraint according to a dimension of an input image signal. The method also includes iteratively determining a plurality of approximations to the input image signal. Each iteration provides an approximation of the input image signal. Each approximation includes a set of dictionary element indices and coefficients. The dictionary is an over-complete dictionary. Iterations of the determining step are terminated when a number of iterations is equal to the sparsity constraint. The method also includes selecting one of the plurality of approximations according to a minimum rate-distortion cost. The method also includes determining an encoded image signal according to non-zero coefficients and corresponding indices for each non-zero coefficient in the selected approximation.

In accordance with an embodiment of the present invention, a method in a data processing system for image decoding includes obtaining a sparsity constraint for an image bitstream, the image bitstream comprising an image. The method also includes obtaining an approximation of the image, wherein the approximation comprising a set of dictionary element indices and dictionary element coefficients, the dictionary comprising an over-complete dictionary. The method also includes determining an decoded image signal according to non-zero coefficients and corresponding indices for each non-zero coefficient in the approximation according to the sparsity constraint.

In accordance with an embodiment of the present invention, an apparatus for encoding an image includes a non-transitory memory storage comprising instructions and one or more processors in communication with the memory, wherein the one or more processors execute the instructions for determining a sparsity constraint according to a dimension of an input image signal. The one or more processors also execute instructions for iteratively determining a plurality of approximations to the input image signal. Each iteration provides an approximation of the input image signal that includes a set of dictionary element indices and coefficients. The dictionary includes an over-complete dictionary. The iterations of determining the approximations are terminated when a number of iterations is equal to the sparsity constraint. The one or more processors also execute instructions for selecting one of the plurality of approximations according to a minimum rate-distortion cost. The one or more processors also execute instructions for determining an encoded image signal according to non-zero coefficients and corresponding indices for each non-zero coefficient in the selected approximation.

In accordance with an embodiment of the present invention, a non-transitory computer-readable medium storing computer instructions for encoding an image, that when executed by one or more processors, cause the one or more processors to perform the following steps is provided. The steps include determining a sparsity constraint according to a dimension of an input image signal. The steps also include iteratively determining a plurality of approximations to the input image signal. Each iteration provides an approximation of the input image signal that includes a set of dictionary element indices and coefficients. The dictionary is an over-complete dictionary. The iterations of the determining step are terminated when a number of iterations is equal to the sparsity constraint. The steps also include selecting one of the plurality of approximations according to a minimum rate-distortion cost. The steps also include determining an encoded image signal according to non-zero coefficients and corresponding indices for each non-zero coefficient in the selected approximation.

In various embodiments, the sparsity constraint is proportional to the square root of a dimension of the image. In various embodiments, the sparsity constraint is equal to twice the square root of a dimension of the image. In various embodiments, iteratively determining a plurality of approximations includes determining non-zero coefficients according to a quantization parameter. In various embodiments, iteratively determining a plurality of approximations includes determining non-zero coefficients according to a normalization of the image signal. In various embodiments, iteratively determining a plurality of approximations comprises performing an orthogonal matching pursuit (OMP) method. In various embodiments, the method, network component, or computer readable storage media further includes the step of or instructions for encoding the image signal into an image bitstream.

The non-transitory computer-readable media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. A sparsity constraint may be determined by a processing unit or a processing module or by a sparsity constraint determination unit/module. Determining a plurality of approximations to an input signal may be performed by a processing unit, processing module, an approximation determining unit or approximation determining module. Selecting a plurality of approximations may be performed by a selector, a processing unit, a processing module, a selection module, or a selection unit. Determining an encoded image signal may be performed by a processor, a processing unit, a processing module, an encoder, an encoded image determining unit, or an encoded image determining unit. Obtaining a sparsity constraint and obtaining an approximation of an image may be performed by a receiver and/or a processor, a processing unit, or a processing module. Determining a decoded image signal may be performed by a processor, a processing unit, a processing module, a decoder, a decoding module, and a decoding unit. The respective units/modules may be hardware, software, or a combination thereof. For instance, one or more of the units/modules may be an integrated circuit, such as field programmable gate arrays (FPGAs) or application-specific integrated circuits (ASICs).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method in a data processing system for image encoding, comprising:
    determining, by the data processing system, a sparsity constraint according to a dimension of an input image signal;
    iteratively determining, by the data processing system, a plurality of approximations to the input image signal, each iteration providing an approximation of the input image signal comprising a set of dictionary element indices and coefficients in a dictionary, the dictionary comprising an over-complete dictionary, iterations of the determining terminated when a number of iterations equals the sparsity constraint;
    selecting, by the data processing system, one of the plurality of approximations according to a minimum rate-distortion cost;
    determining by the data processing system, an encoded image signal according to non-zero coefficients and corresponding indices for each non-zero coefficient in the selected approximation; and the sparsity constraint is proportional to a square root of a dimension of the image.

2. The method of claim 1, wherein the sparsity constraint is equal to twice a square root of a dimension of the image.

3. The method of claim 1, wherein iteratively determining the plurality of approximations comprises determining non-zero coefficients according to a quantization parameter.

4. The method of claim 1, wherein iteratively determining the plurality of approximations comprises determining non-zero coefficients according to a normalization of the input image signal.

5. The method of claim 1, wherein iteratively determining the plurality of approximations comprises performing an orthogonal matching pursuit (OMP) method.

6. The method of claim 1, further comprising encoding the input image signal into an image bitstream.

7. An apparatus, used in coding an image, comprising:
    a processor configured to:
        determine a sparsity constraint according to a dimension of an input image signal;
        iteratively determine a plurality of approximations to the input image signal, each iteration providing an approximation of the input image signal comprising a set of dictionary element indices and coefficients in a dictionary, the dictionary comprising an over-complete dictionary, iterations of the determining terminated when a number of iterations equals the sparsity constraint;
        select one of the plurality of approximations according to a minimum rate-distortion cost;
        determine an encoded image signal according to non-zero coefficients and corresponding indices for each non-zero coefficient in the selected approximation; and the sparsity constraint is proportional to a square root of a dimension of the image.

8. The apparatus of claim 7, wherein the sparsity constraint is equal to twice a square root of a dimension of the image.

9. The apparatus of claim 7, wherein iteratively determining the plurality of approximations comprises determining non-zero coefficients according to a quantization parameter.

10. The apparatus of claim 7, wherein iteratively determining the plurality of approximations comprises determining non-zero coefficients according to a normalization of the input image signal.

11. The apparatus of claim 7, wherein iteratively determining the plurality of approximations comprises performing an orthogonal matching pursuit (OMP) method.

12. The apparatus of claim 7, wherein the processor is further configured to encode the input image signal into an image bitstream.

13. A non-transitory computer-readable medium storing computer instructions for encoding an image, that when executed by one or more processors, cause the one or more processors to perform the steps of:
    determining a sparsity constraint according to a dimension of an input image signal;
    iteratively determining a plurality of approximations to the input image signal, each iteration providing an approximation of the input image signal comprising a set of dictionary element indices and coefficients in a dictionary, the dictionary comprising an over-complete dictionary, iterations of the determining terminated when a number of iterations equals the sparsity constraint;
    selecting one of the plurality of approximations according to a minimum rate-distortion cost;
    determining an encoded image signal according to non-zero coefficients and corresponding indices for each non-zero coefficient in the selected approximation; and the sparsity constraint is proportional to a square root of a dimension of the image.

14. The non-transitory computer-readable medium of claim 13, wherein the sparsity constraint is equal to twice a square root of a dimension of the image.

15. The non-transitory computer-readable medium of claim 13, wherein iteratively determining the plurality of approximations comprises determining non-zero coefficients according to a quantization parameter.

16. The non-transitory computer-readable medium of claim 13, wherein iteratively determining the plurality of approximations comprises determining non-zero coefficients according to a normalization of the input image signal.

17. The non-transitory computer-readable medium of claim 13, wherein iteratively determining the plurality of approximations comprises performing an orthogonal matching pursuit (OMP) method.

18. The non-transitory computer-readable medium of claim 13, wherein the computer instructions for encoding the image, that when executed by the one or more processors, cause the one or more processors to further perform the step of encoding the input image signal into an image bitstream.

* * * * *